June 17, 1969

C. W. WYCKOFF 3,450,536

SILVER HALIDE PHOTOGRAPHIC FILM HAVING INCREASED
EXPOSURE-RESPONSE CHARACTERISTICS

Filed March 24, 1961

INVENTOR.
CHARLES W. WYCKOFF
BY
AGENT 3,450,536
SILVER HALIDE PHOTOGRAPHIC FILM HAVING INCREASED EXPOSURE-RESPONSE CHARACTERISTICS
Charles W. Wyckoff, Needham, Mass., assignor to EG & G, Inc., Boston, Mass., a corporation of Massachusetts
Filed Mar. 24, 1961, Ser. No. 98,176
Int. Cl. G03c 1/90, 3/00
U.S. Cl. 96—68    4 Claims

ABSTRACT OF THE DISCLOSURE

A multilayer black and white photographic film having extended exposure response characteristics. Two or three photographic emulsions having similar spectral response but different speeds are used. Different color couplers may be added to each layer to distinguish images therein. Instead of couplers, stripping film may be used.

---

The invention herein described was made in the course of a contract with the Department of the Air Force.

This invention relates to photo-sensitive materials and more particularly to photographic films and the like having improved response characteristics and methods of making the same.

Heretofore, photographic films have had limited exposure-response ranges depending upon the nature of the photographic emulsion, the type of energy to which it is sensitive, and the particular application for which it was made. In the case of black-and-white photographic film using a silver halide emulsion, the exposure-response range is normally of the order of a few hundred to one. Such a film can, therefore, only record objects where the light energy from the brightest portion is a few hundred times the light energy from the darkest portion when using a camera which is precisely set to match this light-energy range to the exposure-response range of the film. Any miscalculation in pre-setting the camera controls will result in a mismatch which will cause either under-exposure or over-exposure of the film. If the range of light-energy of the object is in excess of the exposure-response range of the film, then the object cannot be fully recorded by the film.

There are many instances where it is desired to record a scene where there is a very great light-energy range such as, for example, in astronomical studies in which photographs of the night sky are taken. Time exposures are required to record the light from the stars of low brightness but such time exposures are much too long for the brightest stars and the moon which would over-expose currently available films. This problem is even more severe in cases where motion pictures are taken of phenomena where the light levels change very rapidly such as a nuclear explosion where a momentarily brilliant flash of light is produced. Normally a plurality of cameras are employed in order to record the full light range of the phenomenon.

It is, therefore, an object of the present invention to produce a photographic material capable of recording objects and phenomena having great differences in electro-magnetic energy levels.

Another object of this invention is to provide a photographic film having such an increased exposure range that light-measuring, exposure compensating, or other special devices are not needed to obtain a useful reproduction.

A further object of the invention is to provide a photographic film having increased image definition over its exposure-response range.

Still another object of this invention is to provide a photographic film which may be used in a simple fixed-focus, fixed-aperture camera whereby the photographer will get useful negatives under greatly differing light conditions.

Still a further object is to provide a photographic film having an increased exposure range for recording objects in color.

Another object of this invention is to provide a method of making a photographic material having a greatly increased exposure-response characteristics as compared to currently available films.

Briefly, this invention consists of combining in one photographic material, a plurality of radiant-energy sensitive emulsions responsive to substantially the same spectral range of energy, but each emulsion having different sensitivity ranges, and a means of separating the exposures recorded by each emulsion. By means of this photographic film, the exposure-response characteristics are greatly increased without resorting to special filters or critical wavelength absorbers. Some prior art photographic films have employed multiple layers of photographic emulsions, but in these cases, each layer was sensitive to different spectral-energy ranges. Specific wavelength absorbers were employed in some cases to insure that each emulsion recorded energy within a limited predetermined spectral range only.

The invention will be more clearly understood by referring to the following description in conjunction with the attached drawings, FIGURES 1A, 1B and 1C of which are much enlarged cross-sectional views of preferred embodiments of this invention.

Figure 1A:
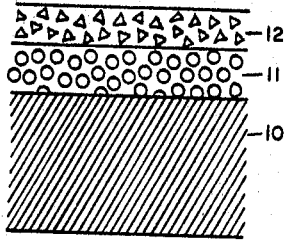
Figure 1B:
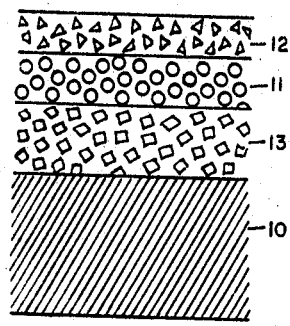
Figure 1C:
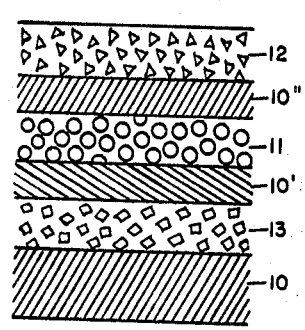
Figure 4:
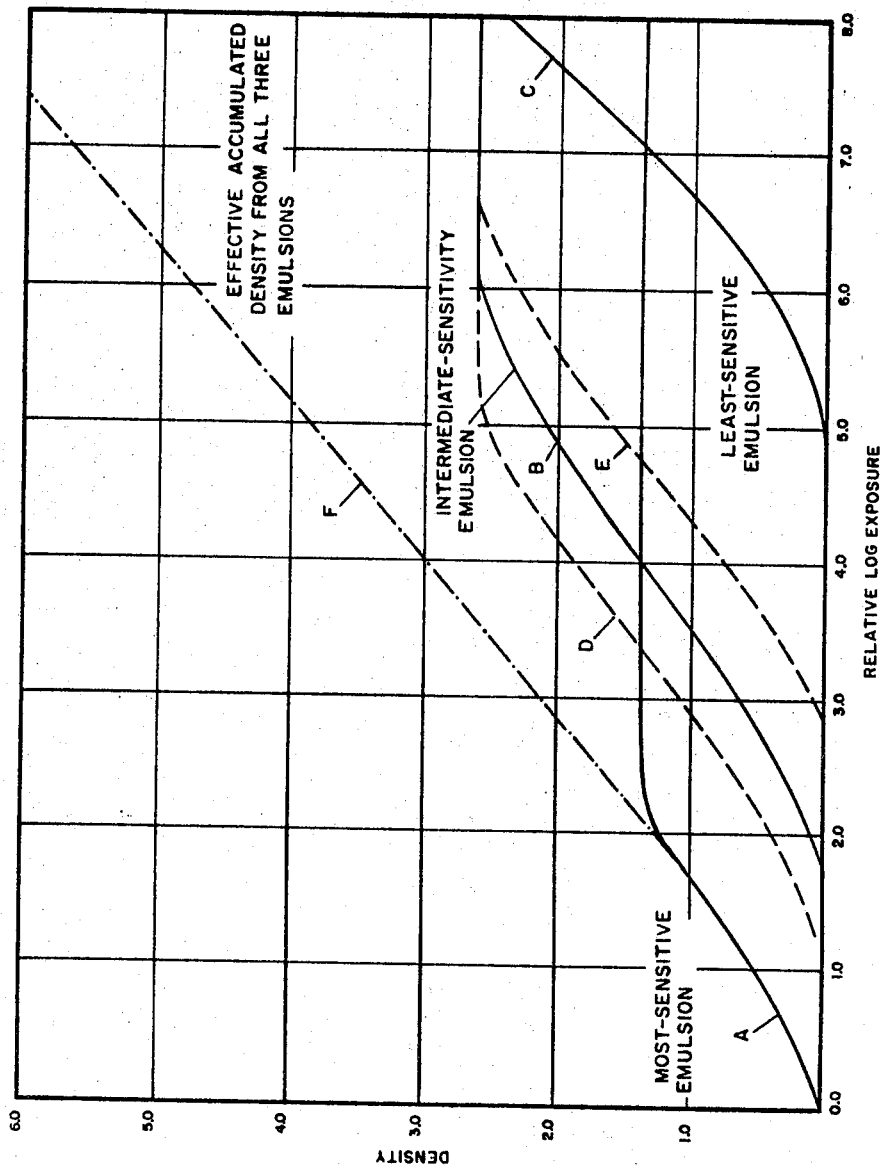
FIGURE 4 is a Density-log Exposure graph showing typical sensitivity curves for the emulsions of FIGURES 1A, 1B and 1C.

With no intention to limit the scope of this invention, but merely to illustrate one preferred embodiment thereof, the invention will be explained in terms of two and three layers of photographic emulsions superimposed upon film supports as shown in FIGURES 1A, 1B, and 1C. The film support or base 10 in FIGURE 1A is coated with a photosensitive emulsion 11 of intermediate sensitivity, superimposed thereupo nis a high-sensitivity photosensitive emulsion 12. The actual emulsions may be chosen, for example, from those having the characteristics shown in FIGURE 4. Curve A of FIGURE 4 represents the Density-log Exposure (D-log E) response of the high-sensitivity photosensitive emulsion 12, an emulsion having an exposure index of 1,000; and curve B represents the D-log E characteristic of the intermediate-sensitivity emulsion 11, one having an exposure index of 10. It should be noted that curve B starts to become responsive to light at a point where curve A approaches saturation. The silver halide in each emulsion in panchromatically sensitized to be responsive to the entire visible spectrum but the degree of sensitivity of the two emulsions differs as shown by the curves of FIGURE 4. There may be times when it is difficult to find two emulsions which have D-log E curves which precisely fit the requirements of these curves, and so a means of shifting the effective D-log E characteristics of an emulsion, such as a neutral density filter, may be disposed between emulsions 11 and 12 or blended with the emulsion 11 so that emulsions may be used even if their curves are not perfectly matched. By using a neutral density filter which passes a predetermined proportion of the incident light to the less-sensitive of the two emulsions, an emulsion having the characteristics of curve D may be used, and in that case, by using a neutral density filter, the effective D-log E curve is shifted to coincide with curve B. In using neutral density filters to shift the D-log E curve of an emulsion, it is required that this emulsion be positioned further from the source of light than the other emulsion so that the neutral density filter will have no effect upon the light while it is passing through the other more-sensitive emulsion. It should be remembered that use of neutral density filters is only one of the many well-known methods of shifting the D-log E curve of an emulsion. Other well-known means such as soluble dyes, dye sensitizers, ripening processes and the like may be employed to shift D-log E curves in either a more-sensitive or less-sensitive direction.

Of basic importance to this invention, is the requirement that the exposures recorded by each emulsion be distinguishable from the exposures in the other emulsion or emulsions. This is so because in printing positives, it may be necessary to attenuate or eliminate completely the exposure of one or more emulsions to reproduce the object. Color couplers adsorbed to at least the more-sensitive emulsion in a two-layer film is one way to differentiate between the emulsions after developing. In my experiments, I used a yellow producing dye in emulsion 12 and no dye in emulsion 11. If desired, a magenta-producing dye could be used in emulsion 11.

As I have explained above, the effective sensitivities of the two emulsions should be so arranged that emulsion 11, the less-sensitive of the two emulsions, begins to become responsive to exposure when the intensity of the light approaches the maximum capability of the more-sensitive emulsion 12 as shown by curves B and A in FIGURE 4. For brevity, this feature will be referred to as "complementary sensitivities."

Figure 2A:
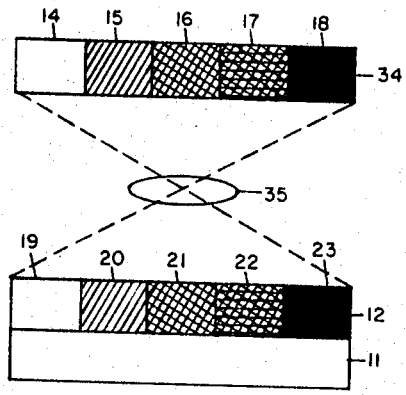
FIGURES 2A, 2B, 2C and 2D are schematic views of this invention showing various degrees of exposure of the photographic emulsions.
Figure 2B:
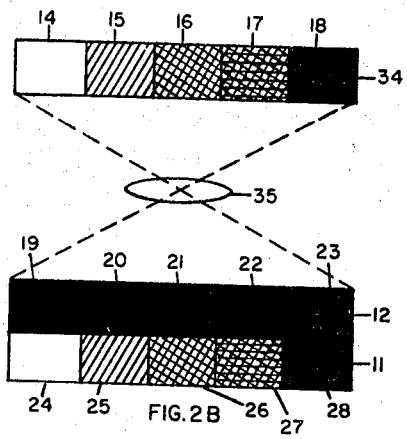
Figure 2C:
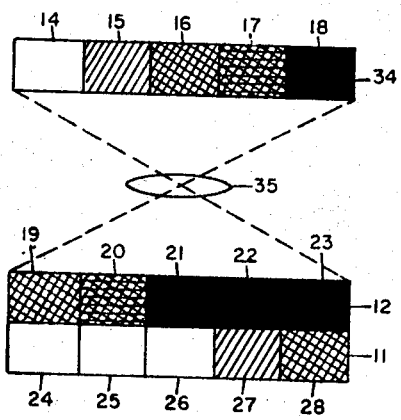

FIGURES 2A, 2B and 2C show a two-emulsion film exposed by light from a typical gray scale 34. FIGURE 2A illustrates sufficient light passing from gray scale 34 through lens 35 to expose only the more-sensitive emulsion 12. The gray scale 34 is shown consisting of five areas identified by the reference designators 14 to 18 inclusive, where area 14 is very light and area 18 is very dark and areas 15, 16 and 17 are intermediate shades of gray, area 17 being the darkest and area 15 the lightest of the three. Lens 35 reverses the relative positions of the gray scale areas 14 to 18 when the emulsion is exposed to light coming from the gray scale 34. The image of the darkest area 18 falls on film portion 19. Since little light arrives from darkest area 18, film portion 19 is only slightly exposed and therefore is shown clear. The light from clear area 14 totally exposes film portion 23 which is shown black in the figure to indicate total exposure of the emulsion. The intermediate areas 15, 16 and 17 of the gray scale 34 produce exposures of different degrees as shown by film portions 22, 21 and 20 respectively. It should be pointed out that the areas of gray scale 34 are shown with different degrees of blackening to indicate different degrees of opaqueness or reflectivity while emulsion 12 is shown with different degrees of blackening to depict different degrees of exposure.

In FIGURE 2A, the light from the gray scale 34 is sufficient to expose only the more-sensitive emulsion 12 but not sufficient to expose the less-sensitive emulsion 11. In other words, the range of light energy striking emulsions 12 and 11 would all be found along curve A of FIGURE 4, to the left of the point where curve B begins. Here, the range of light striking the emulsion is perfectly matched to the exposure-response range of emulsion 12. Therefore, emulsion 11 does not respond at all, due to the fact that it is insensitive to the light energy passing through emulsion 12.

Now consider the case where the light energy striking the film is increased many times. This may be done by greatly increasing the light energy incident upon the gray scale 34 or by greatly extending the time during which the emulsions are exposed to the light. FIGURE 2B shows the effect of such an exposure upon emulsions 11 and 12. The more-sensitive emulsion 12 is totally over-exposed as indicated by the blackening of film portions 19 to 23 inclusive. The light energy which passes through emulsion 12 and is available to expose emulsion 11 causes the same degree of exposure of film portions 24 to 28 of emulsion 11 as was produced in film portions 19 to 23 respectively of emulsion 12 in FIGURE 2A. FIGURE 2B indicates that the range of light energy incident upon the emulsions would all fall along curve B of FIGURE 4 to the right of the point where curve A levels off. In this case we can see that the range of light intensity striking the emulsions is perfectly matched to the exposure-response range of emulsion 11.

A third case to be considered is the instance where the range of light intensity striking the emulsions is not perfectly matched to the exposure-response range of either of emulsions 11 or 12 but is in the range including portions of curves A and B of FIGURE 4. FIGURE 2C shows the effect of this third case on emulsions 11 and 12. Light from darkest area 18 of gray scale 34 partially exposes film area 19 of emulsion 12. More light comes from gray area 17 to partially expose to a greater degree film portion 20. The light from areas 17 and 18 is insufficient to expose to expose film portions 24 and 25 of emulsion 11. The light passing from 16 is sufficient to totally expose film portion 21 but is not sufficient to expose film portion 26 of emulsion 11. The light from area 15 not only is sufficient to over expose film portion 22 of emulsion 12 but also to partially expose film portion 27 of emulsion 11. The light from the lightest area 14 of gray scale 34 over exposes film portion 23 and partially exposes film portion 28 to a greater extent than film portion 27.

It can thus be seen that with tremendous differences in the light intensity, useful and accurate reproductions of the gray scale 34 can be made from the negatives shown in FIGURES 2A, 2B and 2C. In the case of the negative in FIGURE 2A, a positive image of the gray scale can be printed from the exposure of emulsion 12, after the negative has been developed in the usual manner. Emulsion 11 in FIGURE 2B will also yield a print of the gray scale when the over-exposure of emulsion 12 is eliminated. With reference to the negative of FIGURE 2C, it can be seen that by making separate exposures of the two emulsions and adjusting the exposure of emulsion 12 in the printing, the gray scale can be accurately reproduced.

FIGURE 1B shows a three-emulsion film similar to the two-emulsion film of FIGURE 1A. The least-sensitive emulsion 13 is affixed to film support 10, emulsion 11 of intermediate sensitivity is superimposed on emulsion 13, and the most-sensitive emulsion 12 is placed on top of emulsion 11. The sensitivities of emulsions 13, 11 and 12 are shown by curves C, B, and A respectively of FIGURE 4 and have indexes of exposure of 0.01, 10, and 1,000 respectively. As discussed above in the case of a two-layer film, it is not essential to select emulsions that have perfectly complementary sensitivities. Emulsions having the characteristics of curves A, D, and E may be used. By adding neutral density filters to emulsions 11 and 12, or by other well-known means of shifting sensitivity, curve D is effectively shifted to curve B and curve E to curve C.

It is important that in shifting the curves D and E that they are not shifted too far and thus leave a gap in the overall response of the film so that there is a point where none of the emulsions is responsive to the exposure, unless, however, special applications require a gap in the overall response range.

Dye couplers are added to emulsions 11 and 12 in order that each of the three emulsions may be separately identified after the film is developed. I found it convenient to use a yellow producing dye in emulsion 12 and a magenta producing dye in emulsion 11. A dye is not necessary in emulsion 13 because the dyes in the other emulsions provide an adequate means of separating and identifying the various emulsions. Furthermore, by using the proper filters to view the negative after exposure, emulsions 11 and 12 can be rendered invisible leaving only emulsion 13 to be seen by the observer. If, however, a dye is desired for emulsion 13, a cyan producing dye would be very useful.

Figure 2D:
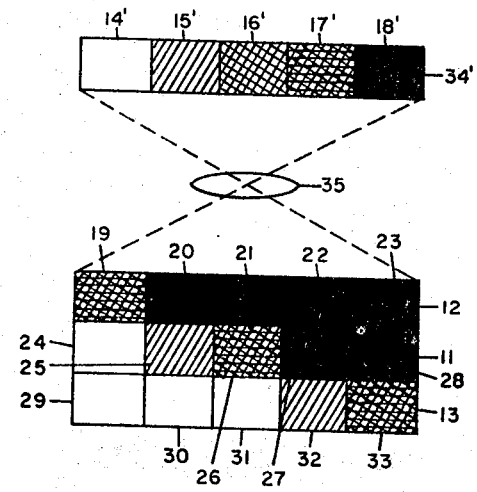

FIGURE 2D shows, schematically, the exposure of a three-emulsion film, such as that shown in FIGURES 1B, and 1C, to an object, such as a gray scale 34' where there is a tremendous difference between the light from the lightest area 14' and the light from the darkest area 18'. This light range is in excess of the exposure response range of each of emulsions 11, 12, and 13 considered individually.

Light from darkest area 18' of gray scale 34' almost completely exposes film portion 19 of emulsion 12 but does not expose film portions 24 or 29 of emulsions 11 and 13. The light from gray areas 17' and 16' over exposes film portions 20 and 21 and partially exposes to different degrees film portions 25 and 26 but does not expose film portions 30 or 31. The light from gray area 15' and the lightest area 14' over expose film portions 22, 23, 27 and 28 and partially expose to different degrees portions 32 and 33.

The extreme range of exposure of gray scale 34' has been recorded by the three-emulsion film in its proper degree of exposure and by adjusting the exposure of each emulsion in the printing process, a good reproduction of any portion of the gray scale 34' can be made. It has been shown that the multi-emulsion film has recorded the tremendous difference in light levels from the object 34'. It is not, however, possible to accurately print such an exposure because of the limited exposure range of currently available printing material, and not because of any limitation of the multi-emulsion film itself. Any particular portion of the emulsion falling within the range of the printing material may, of course, be printed. By compressing the exposure range recorded by the film to the limited range of the material, the entire exposure can be printed but the resulting print would not be an accurate reproduction of the original object 34'.

In order to make my invention more easily understood, I have, thus far, disclosed it in terms of a plurality of emulsions disposed in layers superimposed upon a film base. The invention is not, however, so limited. Any of a number of different arrangements may be used. The emulsions may be mixed together and deposited on the film support as a single layer. Each emulsion may be placed in thin lines either parallel to each other or crossing each other or both. Small closely disposed squares or dots of each emulsion may be used or the emulsions may be disposed on both sides of a transparent film support. In fact, any physical arrangement may be resorted to, as long as each emulsion is so disposed upon the film support that, if the energy from the object were entirely within the response range of that emulsion, the entire object would be recorded by that emulsion. In other words, each emulsion must be so disposed that substantially all the radiation from the object is incident upon it. As previously explained, color couplers may be used to identify the different emulsions. The use of a color coupler in the least-sensitive emulsion would still be optional. Where the emulsions are mixed together or where a less-sensitive emulsion is disposed upon a more-sensitive emulsion, neutral density filters may not be used to shift D-log E curves because the sensitivity of the more-sensitive emulsions would also be affected, but these curves may be shifted by other well-known means including those previously enumerated.

Although I have disclosed panchromatic emulsions sensitive for the entire range of visible light as an example, the invention more accurately applies to emulsions responsive to substantially the same range of energy whether it be the full range of electromagnetic energy including visible light, ultra-violet, infra-red, alpha, beta, gamma and X-rays or some particular portion thereof. An important feature is that each emulsion is not responsive to different parts of this spectrum but rather all emulsions are responsive to the same parts.

No special techniques nor new methods are required in the development of these emulsions. For a discussion of developing such emulsions see Mees, "The Theory of the Photographic Process," Revised Edition, 1954, The Macmillan Company, New York, N.Y., p. 584 et seq.

In printing the negative shown in FIGURES 2A, 2B, 2C and 2D, a panchromatic printing paper, or the like, is required because the images in at least one of the emulsions are colored and because colored filters and colored light are used in the printing process. The images are colored specifically as a means of identifying or separating the emulsions. Consider the negative of FIGURE 2A in which all of the exposure is confined to emulsion 12 which, when developed, is tinted yellow in proportion to its density. In making a black-and-white print of this image, a blue or complementary colored filter is required in order that the yellow colored image will pass light only in proportion to its blue density because the yellow tinted areas of the exposure will be opaque to blue light in proportion to the amount of yellow color contained within the image. The less-exposed areas containing, after development, less yellow color will pass more blue light. Thus the panchromatic printing material will record an image inversely proportional to the yellow density of the exposure in emulsion 12, which is an accurate reproduction of the object, gray scale 34.

When printing the negative of FIGURE 2B, the over-exposed yellow-tinted emulsion 12 will appear to be a yellow filter completely overlaying the black silver image contained in emulsion 11 and will therefore have no effect upon the printing of emulsion 11. For this reason, no additional color filter need be used in printing the negative and the full image contained within emulsion 11 will print as a useful picture.

In printing the negative shown in FIGURE 2C where the film was exposed to a range of light intensity which produced images in both emulsions 11 and 12, exposure of the panchromatic printing material is preferably made through a special filter combination which partially transmits yellow light and fully transmits blue light. In this way the opaqueness of emulsion 12 is attenuated uniformly to the point that film portions 19 and 20 print as film portions 19 and 20 of FIGURE 2A. Film portions 21, 22 and 23 in FIGURE 2C which are shown totally exposed are uniformly attenuated to an intermediate degree. The exposure of film portions 27 and 28 of emulsion 11 are added to the attenuated exposures of film portions 22 and 23, thereby accurately reproducing the gray scale 34.

The negative of FIGURE 2C may also be printed in two steps by first partially exposing the panchromatic printing material through the negative with a blue filter which will attenuate the yellow image in emulsion 12, and then with no filter to partially cancel the effect of the excessive exposure of emulsion 12.

When the two-layer film of FIGURE 1C has been exposed and processed, it may be examined both without a filter and with a blue filter to determine the extent of exposure contained in each layer and which filter combination will be best for purposes of printing.

In the printing of the exposure shown in FIGURE 2D, a three-layer film, a combination of color filters may be used. As previously pointed out, printing materials are not currently available which will record the extreme range of light intensities shown by FIGURE 2D, but the printing procedures will be discussed to show the methods which would be used if such materials were available. The same procedures are followed in printing a portion of the exposure. The most-sensitive or top layer, 12, contains a yellow image which is best printed through a blue filter as has been previously explained. The less-sensitive middle layer, 11, contains a magenta image and can be best printed through a green filter. The least-sensitive bottom layer, 13, in this example, consists of a normal silver image without color and therefore does not require filtration for printing. However, it may be printed through any color filter with no deleterious effects. The blue light required for printing the yellow image will pass through the magenta image as though there was no image present. Likewise the green light used for printing the magenta image will be freely transmitted through the yellow image as though it were transparent. It is therefore necessary to apply partial exposures in making a print. An exposure is made with blue light and adjusted to partially print only a portion of the yellow image. Green light is applied next and will partially print the magenta image, some of which will coincide with the previous exposure. The last exposure may be made with white light and is adjusted to partially print the image of the bottom layer 11. The resultant multiple exposures will produce portions of images from each layer, highlight detail of the print being supplied by the bottom layer record while the middle tones and shadow detail will be controlled by the middle and top layers respectively.

It is also possible to print the record as shown in FIGURE 2D with application of a single exposure provided that the color of the exposing light is comprised of the proper amounts of different colors or wavelengths.

It should be remembered that even though some of the layers are tinted and that colored light is being used in the printing process, the resultant reproduction is a black-and-white photograph of the original object. The coloring of the emulsions and the use of colored light are employed to identify and control the effect of the exposure of each emulsion and to aid in the printing process.

Exactly the same procedure is followed in preparing, using, developing, and printing motion picture film as has been described above in the case of snapshot film for standard cameras. The negative will be printed on a film suitable for use in projectors rather than being printed upon photographic paper but the procedure is the same.

With respect to the curves of FIGURE 4, it should be noted that the most-sensitive emulsion has a D-log E characteristic (curve A) which levels off at a lower density than the other curves. This is the case because a thinner layer of the most-sensitive emulsion was used in order to minimize effects of light scattering and absorption. FIGURE 4 shows that this emulsion has an exposure response range of approximately two decades. Curve B shows that the emulsion of intermediate sensitivity has an exposure response range of about three decades giving the two-emulsion film an exposure range of over five decades. By adding a third emulsion as shown by curve C, the exposure-response range has been extended by at least three decades to give an over-all range in excess of eight decades or a hundred million to one, as shown by curve F which is the effective D-log E curve for the three emulsions. Additional emulsions may be added to further increase the exposure response range of the film, the number of emulsions being limited only by the resulting total thickness of the emulsions, the scattering effect produced thereby, and the number of available dye couplers of suitable colors. A three-layer film made in accordance with my invention would have only minor scattering on about the same scale as well-known three-layer color film.

Figure 3:
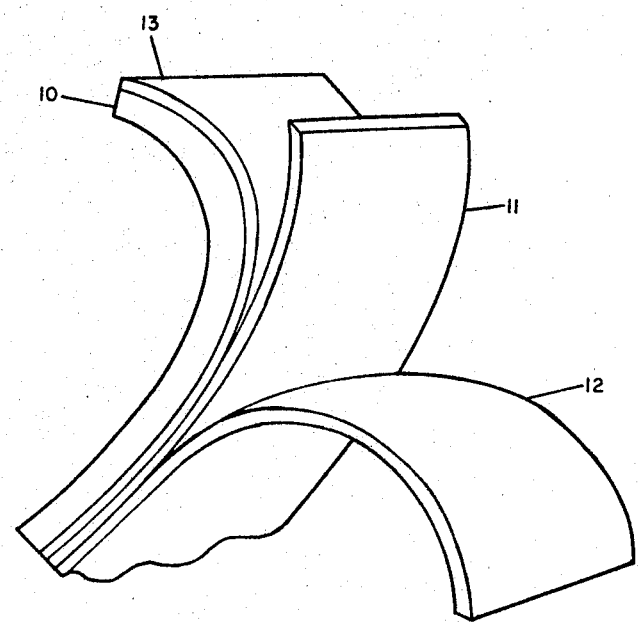
FIGURE 3 is a perspective view of the photographic negative of FIGURE 1C graphically illustrating the separate components thereof.

The exposures in the various emulsions may be optically separable by means of color couplers as described above. These exposures may also be separated physically by means of the film shown in FIGURE 1C. In this modification, three emulsions similar to emulsions 11, 12 and 13 of FIGURE 1B are applied to a film base 10 in the form of a stripping film as disclosed by J. G. Capstaff in the April 1950 edition of Journal of the Society of Motion Picture and Television Engineers, vol. 54, No. 4, in an article beginning on p. 445, entitled "An Experimental 35-mm. Multilayer Stripping Negative Film." Instead of making each layer sensitive to a different primary color as Capstaff disclosed, I have made each layer responsive to the same wavelengths but I have made each emulsion of a different degree of sensitivity so that the effective D-log E curves of emulsions 13, 11 and 12 correspond to curves C, B and A respectively, of FIGURE 4. In this way the exposure response range of the film is extended to eight decades but color couplers are no longer required. The emulsions are separated by means of soluble interlayers 10' and 10" which during the developing process are rendered soluble to facilitate the separation or stripping of the emulsions. This may be done by hand or preferably by transferring the emulsions 11 and 12 to another film base to provide greater support for these emulsions in handling, particularly during the printing process. FIGURE 3 graphically illustrates the separation process of the stripping film after the interlayers 10' and 10" have been dissolved. In printing, each layer is printed separately and the amount of exposure to be given through each layer may be determined by visual examination of the film or by use of a light measuring device, for example, a photocell as disclosed by Dr. H. E. Edgerton in application Ser. No. 651,102, filed on Apr. 5, 1957, now U.S. Patent 3,033,988, entitled "Method of and Apparatus for the Control of Electric Impulses." Since color couplers are not used in this film, there is no need for color filters in the printing process.

Figure 5:
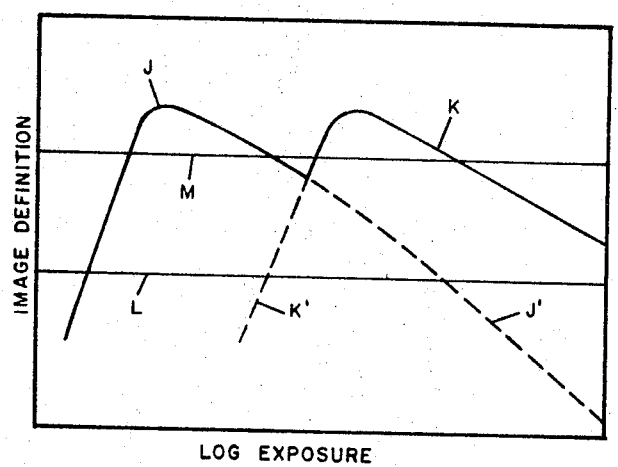
FIGURE 5 is an Image Definition-log Exposure graph of a multi-emulsion film.

My invention is useful not only to extend the exposure-response range of the film but also to improve the resolution ability of the film. In a two-emulsion film constructed in layers as shown in FIGURE 1A or constructed in one of the other modes previously described, the emulsions are chosen in accordance with the curves of FIGURE 5. FIGURE 5 is a graph plotting Image Definition against log-Exposure, where curve J–J' represents the image definition of emulsion 12 with respect to exposure. Due to the dropping off of image definition in the dotted J' portion of the curve, the average image definition is quite low as indicated by the horizontal line L. By using the principles of my invention and employing a second emulsion having a partially overlapping exposure-response range, the average image definition is greatly increased. Curve K–K' represents the image definition of emulsion 11 with respect to exposure. As the figure shows, curves J–J' and K'–K have the same image definition-log exposure curves but, because of their different exposure-response ranges, curve K'–K is displaced from curve J–J' in the direction of less sensitivity. Therefore, as the image definition of curve J–J' is decreasing, with increased exposure, curve K'–K is increasing and intersects curve J–J' before the image definition drops below a useful level. The total image definition of the two-layer film is given by curve J–K which gives an average image definition of about horizontal line M. The increase in average image definition in the two-layer film over the single emulsion film is seen by the difference in lines L and M.

This invention, although designed primarily for black-and-white photography, has application in certain types of color photography. In color photographic apparatus of the type which has three optical systems for recording the three primary colors of an object separately, each of the films associated with each optical system may be a multi-emulsion film. By three optical systems, I mean either three independent complete lens systems positioned close together, or a single lens system having means such as prisms, mirrors, lenses, etc. for resolving the light from the object into its three primary-color components and passing each component to separate areas of the film or to separate films. Each separate film, or each section of the single film, records one primary color. One would record only the red color, while a second would record the blue color and the third, the green color from the object. Filters are used in the optical systems to control the color passed to the film. By using a multi-emulsion film as previously disclosed herein, the extended exposure-response characteristics permit the recording of a very wide range of exposures to the same extent as is shown by the D-log E curves of FIGURE 4. It should be noted that these films are not color sensitive in recording a particular color of the object, but rather are actually panchromatic and record the light transmitted by the particular filter used in the optical system. In cases where three separate multi-emulsion films are used, each may be made responsive to the wavelengths of a different and primary color and thereby preclude the need for filters. The fact that color couplers are used in one or more emulsions for the purpose of exposure discrimination between the emulsions, will have no effect upon the true color of the reproduction because the color coupler is used as a means of printing the proper exposure level. Because we are using color for two purposes, to discriminate between the emulsions and to reproduce the object in color, added steps are required in the printing procedure. A film positive in black and white is made from the developed negative in the manner previously described for printing black-and-white multi-emulsion films. A film negative is made from this positive by the well-known printing process. Alternatively an exposure may be made from the multi-layer negative and processed by the well-known reversal method to yield a negative image. It is from this negative that the color positive is printed on well-known color photographic paper by projecting the exposures through a three-optical system with the same color filters as had been used in the camera originally.

The same process is followed in printing color transparencies and color motion-picture films except that the color image is printed on a color film rather than color photographic paper.

Although I have described my invention with a certain degree of particularity, further modifications will occur to those skilled in the art and all such are considered to fall within the spirit and scope of the present invention as defined in the appended claims.

I claim:
1. A photographic film, comprising:
   a support;
   a first photographic silver halide emulsion layer coated on said support;
   a second photographic silver halide emulsion layer coated on said first layer;
   said first and second emulsion layers being both responsive to substantially the same band of spectral wavelengths;
   a neutral density filter integral with the film for adjusting the speed of one layer to commence responding to impinging light as the other layer approaches saturation; and
   a plurality of color-forming couplers wherein a coupler of one color is in the first emulsion layer and a coupler of another color is in the second emulsion layer to distinguish the images recorded in the first emulsion layer from those images recorded in the second emulsion layer.

2. A photographic film as claimed in claim 1 in which said different color-forming couplers are selected from the group consisting of cyan, magenta and yellow color-forming couplers.

3. A photographic film comprising: a support; a first photographic silver halide emulsion layer coated on said support; a second photographic silver halide emulsion layer coated upon said first layer, said first and said second emulsion layers being responsive to substantially the same band of spectral wavelengths; and a neutral density filter disposed between said first and second emulsion layers, said second emulsion having a higher speed sensitivity than the combination of the neutral density filter and the first emulsion.

4. A photographic film comprising: a support; a first panchromatically sensitized photographic silver halide emulsion layer containing a cyan forming color coupler coated on said support; a second panchromatically sensitized photographic silver halide emulsion layer containing a magenta forming color coupler coated on said first panchromatically sensitized layer, said second panchromatically sensitized layer having a higher speed sensitivity than said first panchromatically sensitized layer; a third panchromatically sensitized photographic silver halide emulsion layer containing a yellow forming color coupler coated on said second panchromatically sensitized layer, said third panchromatically sensitized layer having a higher speed sensitivity than said second panchromatically sensitized layer; said film having therein a separate layer comprising a neutral density filter.

References Cited

UNITED STATES PATENTS

| 656,751 | 8/1900 | Schwarz | 96—68 |
| 746,594 | 12/1903 | Smith | 96—68 |
| 1,303,635 | 5/1919 | Capstaff | 96—68 |
| 1,879,806 | 9/1932 | Kelley | 96—69 |
| 1,897,846 | 2/1933 | Kelley | 96—68 |
| 1,912,693 | 6/1933 | Cornell | 96—68 |
| 2,258,187 | 10/1941 | Mannes et al. | 96—69 |
| 2,376,217 | 5/1945 | Wilder | 96—74 |
| 2,659,671 | 11/1953 | Von Fraunhofer et al. | 96—74 |
| 2,704,254 | 3/1955 | Gresham | 96—68 |
| 3,050,391 | 8/1962 | Thompson et al. | 96—68 |
| 3,141,773 | 7/1964 | Hellmig | 96—67 |
| 2,688,601 | 9/1954 | Herz | 96—84 |
| 2,509,766 | 5/1950 | Gross | 96—74 |
| 3,121,232 | 2/1964 | Byler et al. | 96—68 |

FOREIGN PATENTS

| 774,655 | 5/1957 | Great Britain. |
| 845,217 | 8/1960 | Great Britain. |
| 604,761 | 9/1960 | Canada. |
| 818,687 | 8/1959 | Great Britain. |
| 806,311 | 12/1958 | Great Britain. |

J. TRAVIS BROWN, *Primary Examiner.*

U.S. Cl. X.R.
96—27, 77, 83, 84